Patented Nov. 12, 1940

2,221,628

UNITED STATES PATENT OFFICE 2,221,628

BLUEPRINT COATING

Robert Bowling Barnes, Stamford, Garnet Philip Ham, Riverside, and Leonard Patrick Moore, Stamford, Conn., assignors to American Cyanamid Company, New York, N. Y., a corporation of Maine No Drawing. Application April 16, 1940, Serial No. 329,926

6 Claims. (Cl. 95—7)

This invention relates to improved blueprint coating compositions and blueprint paper.

In the blueprint art it has been the established practice to sensitize paper with a coating solution containing as its essential elements a water solution of a light-sensitive ferric salt such as ferric ammonium oxalate, ferric potassium oxalate, ferric ammonium citrate or the like, and a ferricyanide such as potassium ferricyanide. In other formulae an alkali metal ferrocyanide such as potassium, sodium, or ammonium ferrocyanide has been substituted for part or all of the ferricyanide to give a faster printing paper. However, it was found that for the increase in speed other desirable factors were sacrificed. Thus, for example, an auto-reducing reaction between the ferrocyanide and the ferric salt in the blueprint coating prior to actinic exposure resulted in a blue substance, commonly known as Prussian blue, and which was retained to some degree on the unexposed portions of the paper even after washing, so that these areas were fogged with blue rather than remaining a clear white. Several methods have been advanced to eliminate this "fogging" such as buffering the solution until it was neutral or slightly alkaline, or incorporating in the blueprint solution a hydrolyzable alkali metal compound which would act as an inhibitor.

Another characteristic that was sacrificed with the high-speed coating compositions employing ferrocyanides for part or all of the ferricyanide, is the stability of the sensitized paper. All blueprint paper is subject to some deterioration even when it is not exposed to the light, and this is accelerated by high temperatures and moisture so that storage of sensitized paper in the summer has presented a serious problem.

I have found that an improved blueprint coating composition is obtained if the potassium or sodium ferrocyanide of standard formulations is replaced by a ferrocyanide in which two amidine radicals containing a guanyl group and two alkali metal radicals form the basic portion of the compounds, for example, diguanidine disodium ferrocyanide. When this compound is employed in blueprint coatings in place of the standard ferrocyanides, exposure time can be decreased without any sacrifice in latitude or keeping qualities. This is especially outstanding as the two factors, speed and stability, are somewhat antagonistic, that is, attempts to increase printing speed has resulted in a blueprint paper that when kept unexposed over a period of time showed blue instead of clear white backgrounds. The improved results of the present invention are obtained with all blueprint coating compositions regardless of whether or not there are inhibiting compounds added to the solution. However, when used with a blueprint coating fortified by inhibitors the advantageous results are enhanced. Moreover, my improvement does not incur any new methods of technique but may be used, with marked improvement in every case, in any known blueprinting formulation.

The invention will be further described in conjunction with the following specific examples which show standard blueprint formulations modified according to the present invention. The parts are given by weight except in the case of liquids which are corresponding parts by volume.

EXAMPLE 1

Two solutions were made up as follows:

*Solution A*

| | Parts |
|---|---|
| Water | 100 |
| Sodium hydroxide | 0.65 |
| Ferric ammonium oxalate | 40 |

*Solution B*

| | Parts |
|---|---|
| Water | 100 |
| Diguanidine disodium ferrocyanide | 6 |
| Potassium ferricyanide | 5 |

The two solutions were made up and mixed together at room temperature under darkroom conditions. A control solution was also prepared using 6.00 parts of potassium ferrocyanide for the diguanidine disodium ferrocyanide in Solution B above. Printed strips from the two solutions showed that the blueprint solution containing diguanidine disodium ferrocyanide produced much whiter backgrounds than the control, with improved latitude and bluer intensities.

EXAMPLE 2

The desodium diguanidine ferrocyanide may also be used in an improved blueprint coating composition such as that described in the U. S. Patent 2,218,969 October 22, 1940. Two solutions were made up according to the following formula and then diluted with 140 parts of water.

*Solution A*

| | Parts |
|---|---|
| Water | 100 |
| Ferric guanidine oxalate | 40 |

*Solution B*

| | Parts |
|---|---|
| Water | 100 |
| Diguanidine disodium ferrocyanide | 6 |
| Potassium ferricyanide | 5 |

Printed strips that had been coated with this solution showed results comparable to those obtained in Example 1.

When an amino-amidine ferrocyanide of the present invention is employed with any other blueprint solution, superior results over the standard are obtained, and it is not intended to limit the invention to the particular formulations and details above set forth. Likewise other alkali metals such as potassium, lithium, and the like, may be used in place of sodium in the disodium diguanidine ferrocyanide of the examples, or a combination of two of these may be used. Furthermore it is not intended to limit the amino-amidine radical to guanidine and in its broader aspects the present invention covers the use of any complex alkali metal amino-amidine ferrocyanide in blueprinting, while the alkali metal guanidine ferrocyanides constitute a preferred embodiment.

It should be understood that the proportions of ferricyanide to ferrocyanide in the above examples may be varied at will, and the invention is not limited to the amounts above set forth.

What we claim is:

1. A blueprint coating solution containing a light-sensitive ferric salt, a ferricyanide and a complex alkali metal amino-amidine ferrocyanide.

2. A blueprint coating solution containing a light-sensitive ferric salt, a ferricyanide and a complex alkali metal guanidine ferrocyanide.

3. A blueprint paper having a coating containing a light-sensitive ferric salt, a ferricyanide and a complex alkali metal amino-amidine ferrocyanide.

4. A blueprint paper having a coating containing a light-sensitive ferric salt, a ferricyanide and a complex alkali metal guanidine ferrocyanide.

5. A blueprint coating solution containing a light-sensitive ferric salt, a ferricyanide and diguanidine disodium ferrocyanide.

6. A blueprint paper having a coating containing a light-sensitive ferric salt, a ferricyanide and diguanidine disodium ferrocyanide.

ROBERT BOWLING BARNES.
GARNET PHILIP HAM.
LEONARD PATRICK MOORE.